INVENTOR
Perley R. Glass
By his Attorney,
Harlow M. Davis

Feb. 5, 1935. P. R. GLASS 1,990,321
MARKING MACHINE
Filed July 21, 1930 5 Sheets—Sheet 5

INVENTOR
Perley R. Glass
By his Attorney,
Harlow M. Davis

Patented Feb. 5, 1935

1,990,321

UNITED STATES PATENT OFFICE 1,990,321

MARKING MACHINE

Perley R. Glass, Wayland, Mass., assignor to United Shoe Machinery Corporation, Paterson, N. J., a corporation of New Jersey Application July 21, 1930, Serial No. 469,379

35 Claims. (Cl. 101—21)

This invention relates to marking machines and is herein illustrated as embodied in a machine of the type shown in Letters Patent of the United States No. 1,652,274, granted December 13, 1927 on my application.

Marking machines of this type are particularly useful in shoe factories, garment factories, and other places for the purpose of imprinting one or more rows of characters on the component parts of garments or shoes to indicate size numbers, lot numbers and the like. In such cases the printing must frequently be done upon a stack of work pieces which are fanned, as indicated in the afore-mentioned patent, and either pulled back one at a time or allowed to drop one at a time to bring the next adjacent piece into marking position. If the pieces of work are to be handled conveniently, then the marking head must move far enough away from the work table so as not to interfere with the fanning operation. At the same time an excessive range of movement is not desirable because the printing head, when it is arranged to print a substantial number of characters in a line, must necessarily embody a considerable amount of weight thus tending to produce excessive vibration. Then too a clear impression of the type on the work requires a substantially vertical movement of the printing head with respect to the work table as the impression is made.

One object of the present invention is to provide an improved marking machine which will be of heavy construction enabling a head of substantial size to be carried without excessive vibration when driven at a speed commensurate with satisfactory production and which will produce a clear-cut impression upon the work and at the same time draw the head far enough away from the work table on the up stroke to leave ample room for fanning the work pieces.

One important feature of the invention resides in a marking machine embodying operating mechanism which not only moves the printing member up and down in a straight line at right angles to the work table but is also arranged to swing said member to the rear on the up stroke so as to pull it back out of the line of vision to enable the piece of work placed on the work table to be fully visible to an operator sitting before the machine and to give plenty of room for fanning the work without requiring an excessive range of movement of the printing member.

The mechanism for applying ink to the characters to be printed constitutes one of the most important elements of a marking machine, because no matter how perfectly the rest of the machine operates, the resulting operation cannot be properly performed unless the ink has been supplied in proper quantities and evenly distributed, and this should be done in such a way that there will be no soiling of other parts of the machine, of the work, or of the operator's hands. In many machines of this general type the application of ink is effected by means of a felt pad. Such an arrangement, however, is disadvantageous because the type acting upon the same part of the pad at each inking operation soon makes depressions in the felt so that the ink is applied not only to the type faces but becomes smeared upon the edges of the type pieces. The resulting impression from type which is inked in this manner is apt to be blurred and not clean cut.

Accordingly, some machines of this type are arranged to apply ink by means of a roll which is carried back and forth across the face of the type, as in the patent before mentioned. Another feature of the invention resides in improved mechanism for applying ink to the type characters by means of a resilient roll. In the illustrated construction this roll is resiliently supported and is guided over the type faces by coacting guides and detachably mounted tracks by means of which the application of the ink to the characters is effected without any sliding or scrubbing action.

It is well understood that such an absorbent applying roll can only carry a limited amount of ink without applying an excess to the type characters, and it is usual to provide such machines with a supply roll or the like which is saturated with ink and by means of which additional ink is transferred to the applying roll at each operation of the machine. In accordance with still another feature of the invention the illustrated machine is provided with hangers upon which both the applying roll and the supply roll are mounted. Other associated operating mechanism is so constructed and arranged that the two rolls are brought into contact as they are returned to inoperative position and pressed together with the desired amount of force so as to squeeze just the right amount of ink out of the saturated supply roll and furnish it to the applying roll. Each of the illustrated rolls is so arranged that it can readily be detached from the machine and dropped down into the space between the printing head and the work table merely by pulling out slidable journal blocks by means of which said rolls are supported in the carriers therefor.

When machines of this character are utilized in shoe factories, it is particularly desirable that they shall be so constructed that the row of characters which is impressed on the work may be readily changed so that the operator can, without undue delay, print the same lot number and a variety of size numbers, for example, on a pile of pieces. Accordingly, such machines usually employ printing heads which embody a plurality of type disks, each carrying a variety of digits and constructed so that the row of characters which is to be imprinted may readily be changed. It is frequently desired to print more than one row of characters in such machines and then it is customary to employ a type carrying plate of the kind illustrated in Letters Patent of the United States No. 1,547,332, granted July 28, 1925 upon the application of Guy L. Keene. Such type plates, in order to print characters simultaneously with the row of characters found upon the bottom teeth of the successive disks, must necessarily have their characters in the same plane with those on the disks and hence must fit so closely against said disks as to prevent their rotation until the type plate is dropped away from the printing head. Frequently such type plates are arranged to receive interchangeable type characters.

To facilitate the rapid interchange of characters upon the type plate, another improved feature of the invention resides in an improved construction of the type plate itself designed to hold the individual characters more firmly in position and also to facilitate the interchange of such characters. Still another feature of the invention resides in an improved mechanism for supporting the type plate upon the printing head by means of which the position of the type plate may be operator-controlled and said type plate may be depressed to permit the rotation of the type disks. In the illustrated construction, a type plate is mounted upon a carrier pivotally supported upon the printing head and a treadle mechanism is interconnected with this carrier so that when the machine is in stopped position the operator may, by stepping on the treadle, drop the type plate away from the printing head, leaving both hands free for selective release and rotation of the type disks.

The type disks of the printing heads of machines of this type may be heated. Accordingly, to facilitate operation of the type disks of the printing head when it is desired to interchange said disks in a head which is heated the operating handle for rotating the disks in the illustrated machine is supported upon the head at a point considerably above the disks and is connected to the operating member for said disks by means of a train of gears. As a further protection for the operator the handle itself is heat-insulated from the gear to which it is connected.

These and other features of the invention will now be more fully described in the following specification, taken in connection with the accompanying drawings, in which.

The machine is of the type illustrated in the Glass Patent No. 1,652,274 to which reference has been made above and as in that machine the pieces of work are supported upon a work table 10 to receive the impression of type characters on a printing head 12 which is oscillated up and down into contact with the work. Any suitable construction of printing head may be utilized such as that shown in the patent just mentioned. The marking head herein illustrated includes type disks 14 held against displacement by latches 16 and capable of being rotated, when released, by means of washers 18 which are carried on a hollow shaft 20 connected by means of gears to an operating handle 22. The gear ratio is such that the handle can be rotated easily even though the disks themselves are hard to turn. The operating shaft is made hollow for the reception of a heating unit 24 and the handle 22 is carried as far away from the heated head as can conveniently be done, and is connected to its shaft through heat insulation comprising a hollow ventilated tube 26. This arrangement positions the handle far enough away from the work table so that it will not hit the operator's knuckles as he holds the work on the table and, at the same time, keeps the handle cool.

In order to help the operator to position the work properly upon the table 10 it is desired to have the head 12 raised to such a position that it will not interfere with the visibility of the table by an operator sitting in front of the machine; at the same time it is not desired to raise the printing head 12 any higher than necessary because of the considerable weight of the printing head which must be oscillated. In my improved machine the arrangement is such that the printing head is not only moved upwardly, but is also swung toward the rear so as thereby to increase the visibility of the work table and to provide ample room for fanning the work.

In order to secure this combined raising and swinging movement of the printing head the machine is provided with operating mechanism best shown in Figs. 1 to 4 and mounted within a hollow frame 30. At the top of the frame a walking beam 32 is mounted on a transverse pivot 34, and the head 12 is suspended from a forward end of this beam 32 by means of hanger 36 to the lower end of which the printing head is secured by means of screws 38 and 40. The walking beam is oscillated through a pitman 42 at the rear of the machine to which is connected a hollow cam lever 44 surrounding a three-point cam 46 mounted on a transverse cam shaft 48. The arrangement is such that a dwell is provided to hold the heated head 12 in contact with the work. The forward end of this cam lever 44 is pivoted to the frame on a hollow stud 50 extending through a boss 52 formed upon the inside of the right-hand portion of the hollow frame. Swinging movement of the printing head is secured by means of a link 54 secured to the upright link or hanger 36 just above the printing head by pivot screws 56. The link 54 is made double for stiffness and at its rear end is pivoted at 58 to the lower end of a hanger 60 swinging on the transverse pivot 34. One portion of this hanger extends down on the right side of a cam 62 secured to the cam shaft 48 and having on its right side a cam track 64. On an extension 66 of the hanger 60 is a cam roll 68 riding in the track 64 and arranged to impart to the link 54 a front-to-back movement. The arrangement is such that the head is swung to the rear when it is near the top of its up-stroke, and on its down-stroke the head is moved forwardly and downwardly with the later part of the down movement exactly at right angles to the work table so that there will be a firm and even impression of the type characters upon the work and no danger of blurring.

Figure 2:
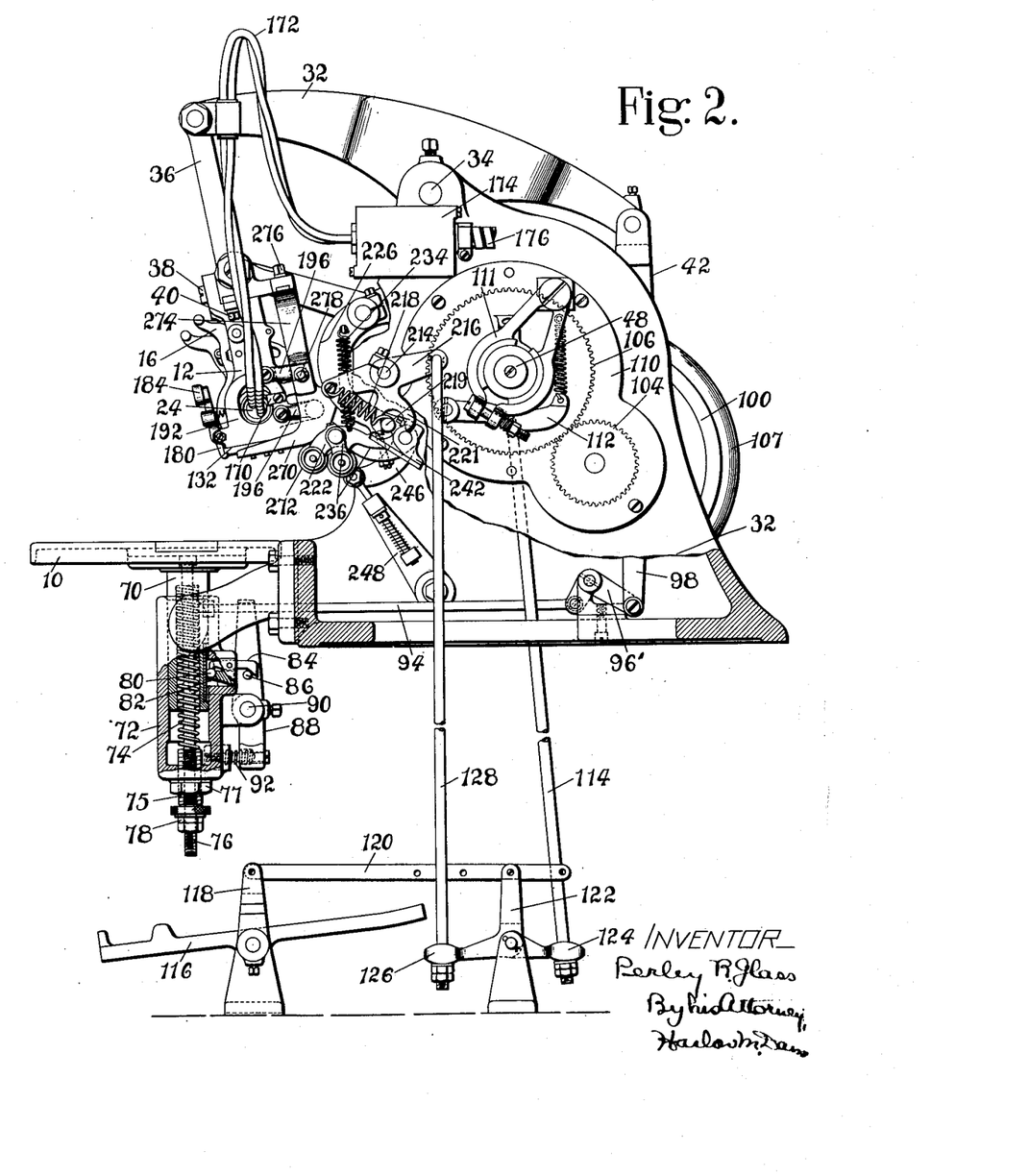
Fig. 2 is a side elevation with parts broken away and in section.
Figure 3:
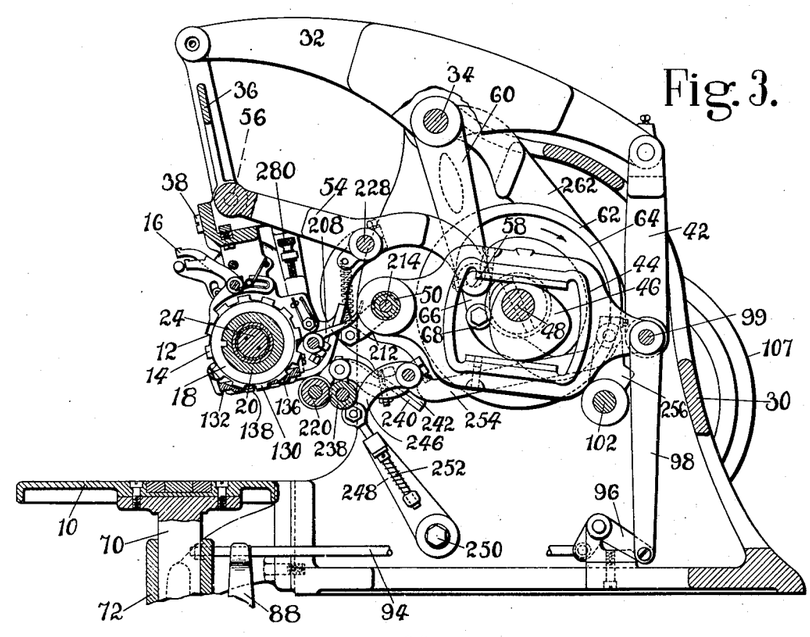
Figs. 3 and 4 are vertical sections from front to back through the upper portion of the machine to show the operating mechanism.
Figure 4:
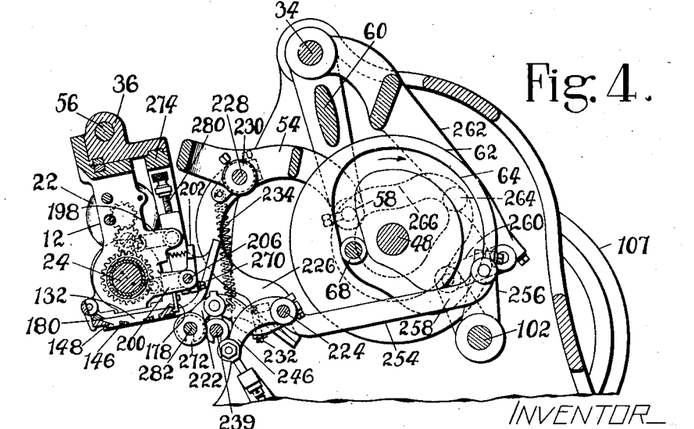

When it is desired to use the machine for work pieces of varying thicknesses or for a stack of work, the work table may be arranged to be self compensating as is herein shown, it being mounted upon a post 70 slidable in a bracket 72 secured to the front of the machine and urged upwardly by an adjustable spring 74. The limit of upward movement is determined by a bolt 76 to which are secured stop nuts 78. The table is retained in fixed position against the action of the spring 74, until the printing head 12 commences to press against the work, by means of a roller latch 80 interposed in a wedge shaped slot in the bracket 72 and held in locking position by a leaf spring 82. The release of this latch in timed relation to the operation of the printing head is secured by means of a pivoted trigger 84 having at its rear end a cam surface for engagement with a pin 86 on an upright lever 88 pivoted at 90 on the bracket 72. This lever is normally spring-pressed to inoperative position by a spring 92, but may be turned clockwise as shown in Fig. 2 by the operation of a horizontal rod 94 passing through the forked upper end of the same lever provided with nuts 96 at its forward end for engagement with the lever when the rod is drawn to the rear. Actuation of this rod is effected through a bell crank 96′ by means of a vertical link 98 secured at 99 to the pivotal joint between the cam lever 44 and the pitman 42. The arrangement is such then that the table is held latched against upward movement in the position last assumed until the printing head is ready to bear against the work whereupon it is automatically positioned by means of the spring 74 and the printing head, the latch having been released through the trigger 84. The tension of the spring 74 may be adjusted by a threaded sleeve 75 held in adjusted position by lock nuts 77.

Figure 1:
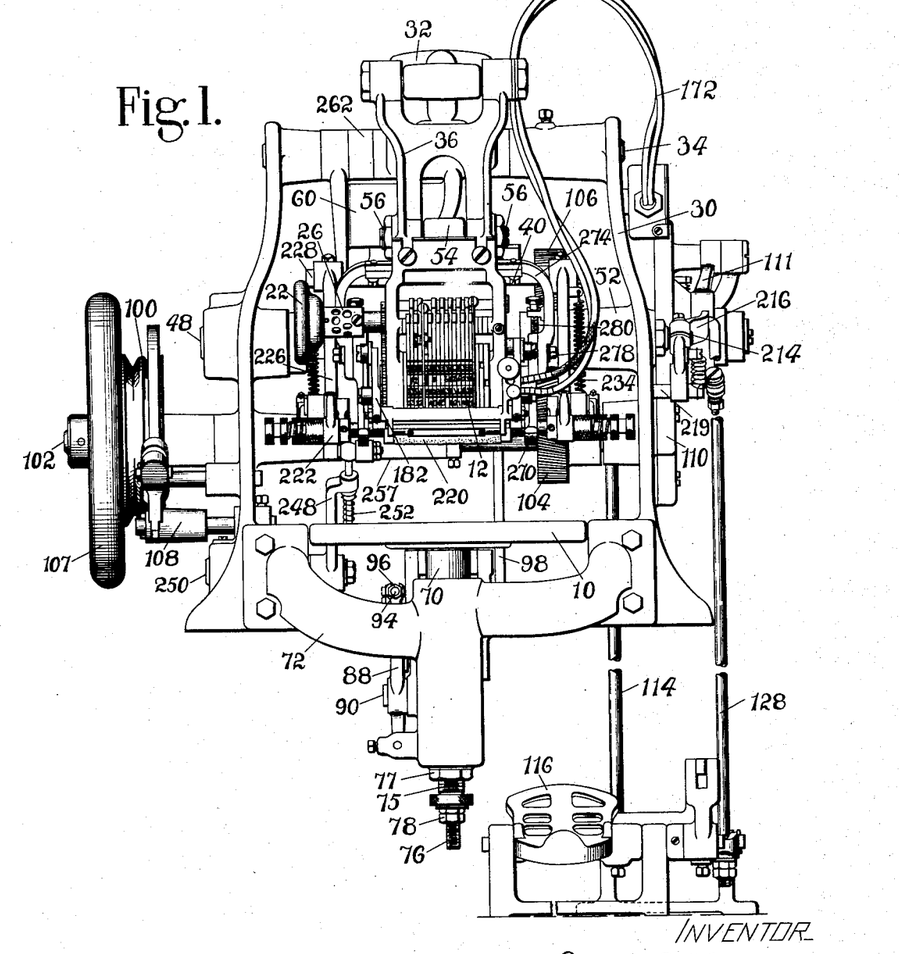
Fig. 1 is a front elevation of the machine.

As will be seen from an inspection of Fig. 1 the machine is provided with fast and loose pulleys 100 mounted on a drive shaft 102 which is connected with the cam shaft 48 by means of gears 104 and 106. A hand wheel 107 is also mounted on this shaft 102. A belt shifter 103 enables the easy transfer of a driving belt from one pulley to the other pulley. The machine is provided with a single revolution clutch (not shown) which is associated with the cam shaft 48 and within a casing 110 on the right-hand side of the hollow frame 30, and the clutch may be released by drawing down upon a spring-pressed clutch lever 112 through a treadle rod 114. A brake 111 is associated with the cam shaft 48. This treadle rod 114 may be depressed through downward movement of a toe end of a treadle 116 having an upright arm 118 which is connected by a link 120 to a bell crank 122, one arm 124 of which loosely engages the rod 114 and bears against nuts upon the lower end of said rod. The bell crank 122 also has a forward arm 126 associated with another treadle rod 128 for a purpose which will be later described.

Figure 5:
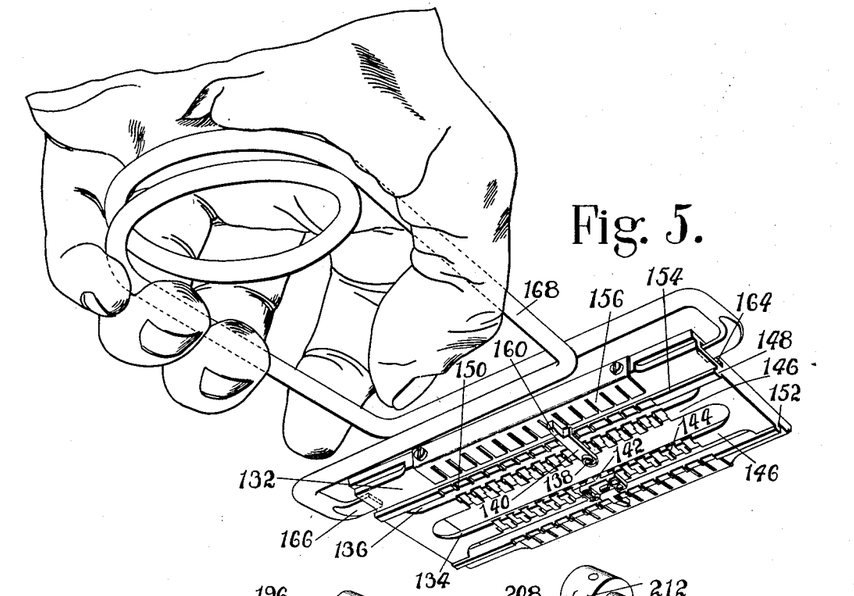
Fig. 5 is a perspective view of a detachable type plate.

In order that the machine may be used for printing more than a single row of characters formed upon the bottom row 130 of teeth upon the type disks, the printing head is provided with a detachable type plate 132, of the type of that which is described in United States Letters Patent No. 1,823,030, granted Sept. 15, 1931, upon an application filed in the name of Harry A. Clarke, and in said aforementioned Keene patent, No. 1,547,332. This type plate 132 is illustrated more in detail in Figs. 5, 6 and 7, and will be seen to comprise a window-opening 134 for the reception of the bottom row 130 of teeth on the type disks and the plate 132 is also provided with grooves 136 parallel to the window-opening 134 and adapted to receive the adjacent rows of teeth on the type disks. As explained before, this type plate 132 is intended for detachably supporting a set of type characters 138 each of which has a body portion 140 having at its forward end a short dovetail 142 for reception in any one of the undercut ways 144 formed in the cross bars 146 adjacent to the window-opening 134. It will be noted that the undercut ways are widened at 145 toward the outer edge of the bars 146 to facilitate the insertion of the dovetail 142 upon the type characters, it being possible to drop a character into the widened portion of the groove and then to slide it forward into interlocking arrangement with the under-cut portion 144. The arrangement just described holds against lateral or up-and-down displacement the forward ends of the body portions 140 of the type characters. The rear ends of the body portions 140 pass over bars 148 just outside the grooves 136 and upon these bars are provided ribs 150 to prevent lateral displacement of the rear ends of the body portions of the type characters. These bars 148 are undercut as shown in 152 to provide a rib 154 extending at right angles to the ribs 150 to co-operate with the inward projections 162 on the under side of the body portions 140 thereby to prevent up-and-down displacement of the type characters. Flat retaining springs 156 constructed as described in said application of Harry A. Clarke, are secured to the edges of the plate, and the flat inner ends of these springs snap up into engagement with shoulders 158 just beneath tails 160 formed on the body portions 140 of the type characters.

It will be noted that the space provided for the retaining springs 156 between the tails 160 of the type members and the plate itself is limited. As a consequence any force applied tending to displace the type members longitudinally thereof can not buckle the spring members and the holding arrangement becomes all the more effective without the necessity of making the springs unduly stiff. It will also be noted that the tails 160 on the type characters are narrower than the body portions 140 so that they do not cover the full width of the springs 156 thus allowing space for the insertion of pincers or fingers to depress a desired spring in order to permit the removal of any of the characters. If desired, a plurality of characters may be combined as shown at 141 upon the same body portion. By the construction just described the type characters are retained in position very firmly upon the type plate while at the same time permitting a ready removal and replacement thereof when it is desired to utilize other characters. In order to facilitate handling the plate when it becomes heated, flat slots 164 are formed in the ends of the plate for the reception of flat ends 166 upon a pair of spring tongs 168 which may be snapped into said grooves to allow the operator to hold the plate rigidly in alinement with the tongs when detached from the head and while type characters are replaced.

The type disks and the type characters may be heated for the purpose of getting a better impression upon certain kinds of leather as in work upon innersoles by means of the cylindrical electrical unit 24 received within the type disks and held there by clips 170 and supplied with current through flexible leads 172 joined within a junction box 174 to a suitable cable 176 extending to a source of supply.

Figure 6:
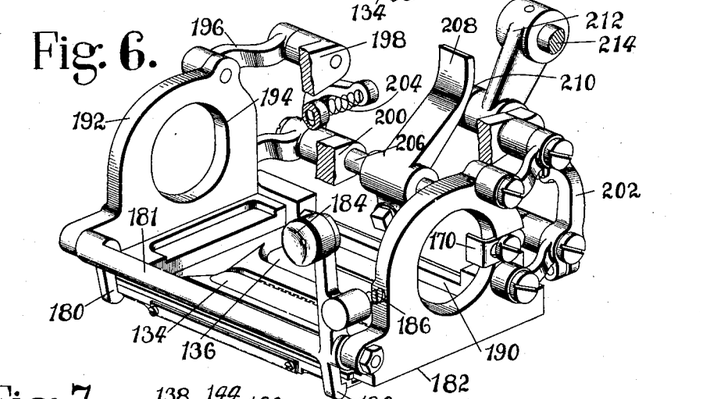
Fig. 6 is a similar view of a carrier for this type plate.
Figure 7:
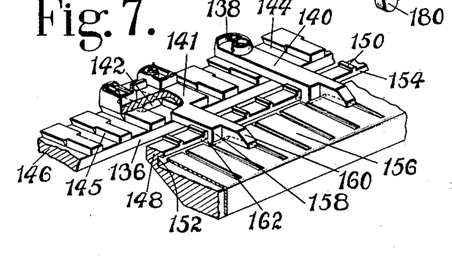
Fig. 7 is a fragmentary perspective view of a portion of the type plate on a larger scale.

In order that the type plate 132 may be removed for the interchange of type characters, it is detachably secured by hooks 178 and a pair of releasable latches 180 (Fig. 4) joined by a rod 181 (Fig. 6). The hooks and retaining latches 180 are not mounted directly upon the printing head but rather upon a carrier 182 best shown in Fig. 6. From this figure, it will be seen that the latches 180 are provided with a finger piece 184 by means of which the plate may be released by moving the latches against the tension of a spring 186. This carrier has a bottom portion comprising side bars 190 which are joined to end plates 192 having openings 194 for the passage of the heating unit 170. This carrier is mounted in a manner to be described so that the carrier and type plate may be moved downwardly away from the printing head 12 to permit the rotation of the type disks so that the characters in the bottom row of teeth 130 may be changed. Because of the fact that the type plate fits so closely with the type disks in order to bring the type characters 138 in the same plane with those upon the bottom row of teeth 130, it is necessary to depress this type plate every time it is desired to change the type disks by rotating the handle 22. Accordingly, there is provided an arrangement which allows the type plate and its carrier 182 to be dropped when the machine is in inoperative or stopped position by stepping on the heel end of the treadle 116 and thus depressing the rod 128. To this end the type plate carrier 182 is mounted on the printing head 12 by means of parallel links 196 pivotally joined to said carrier and to lugs 198 and 200 (Fig. 4) formed at the rear of the side frames of the printing head 12. The lower links 196 are each provided with upwardly extending arms 202 for co-action with springs 204 by means of which the carrier 182 is normally held in raised position in close engagement with the printing head. These lower links 196 are joined by a rod 206 on which there is mounted an arm 208 extending upwardly to the rear and slightly curved at its upper end. When the machine is in stopped position this arm is in position to be engaged by a roll 210 upon the lower end of an arm 212 mounted on a rod 214 passing through the hollow shaft 50 journalled in the boss 52 of the frame. As best shown in Fig. 2, this rod 214 is provided at its outer end with a bell crank 216 to one arm of which is connected the treadle rod 128 and to another arm of which is connected a spring 218 secured to a pin 219 on the side of the frame, this spring being arranged to hold the lever 212 normally in a depressed position so that it will not interfere with the upper end of the arm 208 as the printing head moves upwardly to the rear. Movement of the bell crank lever 216 in both directions is limited by a forked extension 221 loosely engaging the pin 219. This forked extension 221 limits the movement of the bell crank 216 in one direction under the impulse of the spring 218 and also provides a positive limit for the movement which may be imparted to the carrier 182 by stepping on the heel end of the treadle 116. The parallel link support which is provided for the type plate carrier enables the type plate to be moved sufficiently far away from the printing head to allow manipulation of the type disks while requiring a minimum displacement.

The application of ink to the faces of the characters on the bottom row of teeth 130 and to the rows of characters 138 on the type plate is effected by means of an ink applying roll 220 pivotally supported between a pair of arms 222. The arms are supported at their rear ends upon a transverse rod 224 carried on curved hangers 226 clamped at their upper ends upon another transverse rod 228 which is pivoted in the link 54 and is held against axial movement therein by means of suitable collars 230 which are held against the sides of said link 54 by set screws. The arms 222 supporting the ink roll are held upwardly to a limiting position determined by stop screws 232 by means of coiled springs 234. These springs are not attached directly to the arms 222 but rather are secured to bell-crank levers 236 which are pivoted on said arms just to the rear of the applying roll 220 and are arranged also to support from the common hangers 226 a saturated supply roll 238 carried on a shaft 239. The upper ends of the springs 234 are secured to the curved hangers 226. The other arms of the bell cranks 236 carry plates 240 resting against rocker-shaped cams 242 which are secured to the transverse rod 224 on which the arms 222 are mounted. This rod is loose in the arms 222 but is secured to the rocker cams 242 by means of clamp screws 244. It is also secured to a control arm 246 which is attached to the upper end of an extensible arm 248 pivoted upon the left side of the frame 30 upon a stud 250. A spring 252 surrounding part of the extensible arm is arranged to bear against suitable abutments so as normally to hold the arm extended to full length. There is also loosely joined to the transverse rod 224 an operating link 254 which is cam controlled so as to swing the rod 224 and its hangers 226 to carry the ink roll 220 across the face of the type and back again just as the printing head starts to descend. To this end the rear end of the control link 254 is pivoted (Fig. 4) to the right-hand arm 256 of a bell-crank 257, which is fulcrumed on the drive shaft 102 straddling the cam 62 and has another arm 258 at the left side of said cam. This arm 258 is connected by means of a short link 260 to the lower end of a rocker arm 262 suspended from the cross shaft 34 and provided with a cam roll 264 which travels in a cam track 266 on the left side of the cam 62. As a result of this mechanism the ink roll 220 is moved from front to back to roll over the faces of the type, being held up toward the type by spring pressure, and the relation of the rocker cams 242 to the bell cranks 236 is such that the ink roll 220 and the supply roll 238 are separated as the roll 220 comes in contact with the type but are pressed firmly together when said rolls are at the rear of the printing head and are approaching inoperative position. Commonly, both the ink roll and the supply roll will be made of felt and may be built up from a series of disks threaded on the respective shafts. It is possible, therefore, to saturate the supply roll with more ink than should be applied directly to the type faces so that the two rolls may be squeezed together and rotated somewhat by reason of a construction about to be described, whereby the applying roll 220 is given a fresh supply of ink at each operation of the printing head.

In order that the applying roll may rotate freely and evenly over the type faces and not be subjected to undue wear because of contact with the corners of the type characters, I have provided curved tracks 270 which are mounted on the printing head for movement therewith and have lower end portions disposed in predetermined relation to the plane of the type faces. The rear ends of these tracks are curved upwardly so as thereby to soften the approach of the inking roll as it moves toward the type faces. The inking roll itself does not bear directly upon the tracks but is provided with truck rolls 272 having rigid centers and covered peripheries which travel along the tracks and produce the guiding and rolling action desired. By reason of the contact of these truck rolls with the tracks the applying roll will be rotated in contact with the supply roll 238 when said rolls are in the neighborhood of the stop position of the machine. This will result in turning the supply roll at each operation of the machine so as to bring a fresh surface of its circumference into contact with the applying roll 220. The individual tracks 270 are supported on supports 274 which are secured to the lower end of the head supporting hanger 36, a tongue-and-groove connection being provided in order to insure absolute alinement of the tracks at the sides of the head. By means of this arrangement it is possible to provide a set of tracks for each width of printing head or to adjust said tracks laterally, if desired, by providing an elongated slot for the attaching screw 276. Each of the tracks is made vertically adjustable by a slot-and-screw construction 278 in its support, and adjusting screws 280 are provided upon the respective tracks to enable accurate positioning of said tracks with respect to the plane of the type disks so that there will be a simple rolling contact between the applying roll 220 and the type faces, avoiding any sliding or scrubbing action. Due to the difference in size between the applying roll 220 and the truck rolls 272, as shown in Fig. 11, the position of the tracks will not usually coincide with the plane of the type faces.

Figures 8, 9, 10, 11:
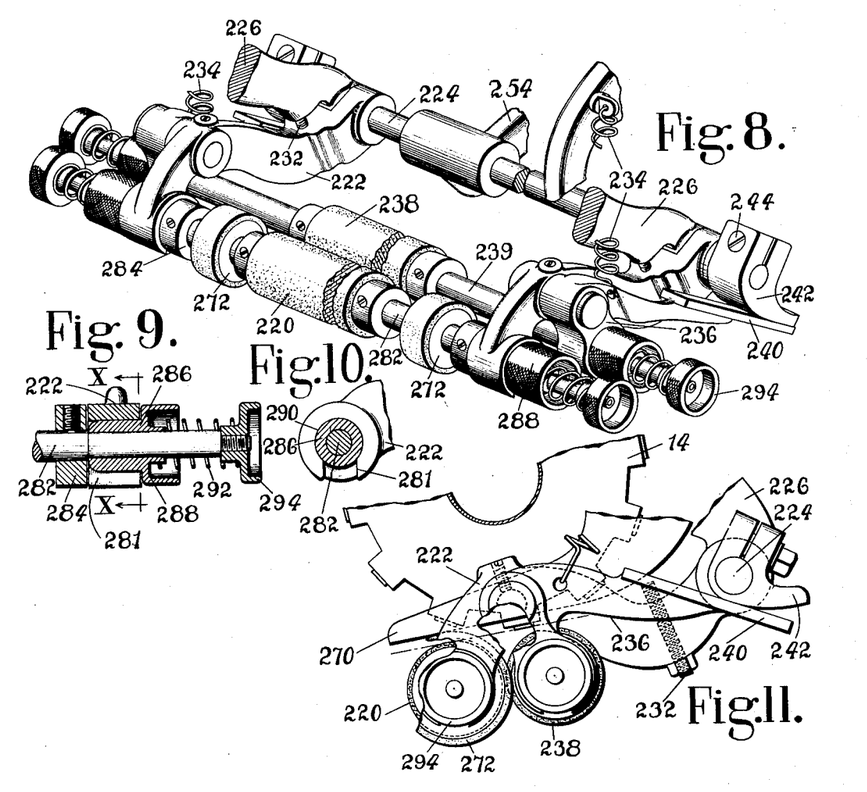
Fig. 8 is a fragmentary perspective on an enlarged scale showing the ink rolls and the carrying arms therefor.
Fig. 9 is a fragmentary section along the axis of one of the rolls to show the retaining mechanism.
Fig. 10 is a section on the line X—X of Fig. 9.
Fig. 11 is a fragmentary side elevation on an enlarged scale showing the relation of the ink rolls to the type disks.

Handling of the ink rolls is facilitated by the manner in which each of the rolls is mounted in its support, and it will be noted from an inspection of Figs. 9 and 10 that the outer ends of the arms 222 are slotted at 281 to permit the passage of the shaft 282 on which the supply roll is mounted. The axial position of this shaft with respect to the arms 222 is determined by collars 284 held on the shaft by set screws, and the shaft is provided with a pair of slidable journal blocks 286 having enlarged knurled handles 288 which may readily be grasped by the operator to enable the journal blocks to be moved axially along said shaft. For the reception of these journal blocks, the arms are provided with enlarged recesses 290 adjacent to the slots, in which recesses said journal blocks fit. The journal blocks are held in the recesses 290 by means of springs 292 surrounding the shaft 282 and bearing at their inner ends within recessed portions of the knurled handles 288 and at their outer ends against heads 294 which are threaded upon the ends of the shaft. The operator needs, therefore, only to pull axially upon the knurled handles 288 of the journal blocks to withdraw them from the recesses 290, whereupon the ink roll and its associated parts may be dropped down into the free space between the printing head and the work table, and readily removed from the machine without danger of soiling any of the parts thereof. A substantially identical construction is provided for mounting the supply roll 238 in the bell-cranks 236 so that when this roll needs to be removed for cleaning or the application of additional ink it can readily be done.

In the operation of the machine, the heel end of the treadle 116 will be depressed if it is necessary to rotate any of the disks on the printing head so as thereby to cause the coacting arms 212 and 208 to drop the type plate carrier 182 away from the head, leaving ample room for the manipulation of the type disks. This arrangement also leaves both of the operator's hands free to depress the retaining latches 16 while, with the other hand, the handle 22 is rotated to turn the disk which has been released. If it is necessary, the type plate can be removed from the machine, utilizing the tongs 168 shown in Fig. 5, by releasing the latches 180 by means of the finger piece 184, and bringing the type plate to a position where the characters 138 may be interchanged as desired. Having replaced the type plate in the carrier, the operator will place a piece of work or a stack of work upon the table 10 and depress the toe end of the treadle 116 to release the clutch-controlled lever 112 and allow the machine to go through its cycle. If the treadle is held in depressed position, the machine will repeat its cycle as long as the treadle is held down, but if the treadle is at once released the machine will make a single cycle and then stop. Durini this cycle the ink applying roll 220 will be carried out over the type faces to apply ink to the latter and then will be carried back again to get a fresh supply of ink from the supply roll 238. Then the printing head 12 will be swung outwardly by means of the link 54 and downwardly by means of the hanger 36 as the walking beam 32 is oscillated, thus causing an impression of the type to be made upon the work.

Having thus described my invention, what I claim as new and desire to secure by Letters Patent of the United States is:

1. In a marking machine, a work table, a printing member, power-operated means for moving said printing member toward and away from the work table constructed and arranged to bring the printing member into contact with the work by means of movement substantially at right angles to the plane of the work table, and cam-controlled means for varying the path of movement of the printing member constructed and arranged to carry the printing head to the rear as it moves away from the work whereby the visibility of the work is improved and ample room provided for fanning the work.

2. In a marking machine, a work table, a printing member, power-operated means movable up and down for supporting said printing member, a hanger pivoted on said supporting means to which said printing member is secured adjacent to the lower end of the hanger, and cam-controlled means for controlling the movement of said hanger constructed and arranged to cause its approach to the work to be substantially at right angles to the work table and to tilt said hanger away from the operator on the up stroke.

3. In a marking machine, a work support, a power actuated walking beam, a hanger pivotally supported at the forward end of said beam, a printing member on said hanger movable toward and away from the work support as the walking beam is oscillated, and cam-controlled means connected to an intermediate part of said hanger constructed and arranged to pull back the hanger when the printing member is raised from the work thereby to increase the visibility of the work support.

4. In a marking machine, a work support, a printing member, a pivotally mounted hanger supporting said printing member, power-operated means for raising and lowering the hanger to carry the printing member toward and away from work on the work support, a link connected to an intermediate part of said hanger, and power-operated cam-controlled means for moving said link to pull back the hanger when it is in raised position.

5. In a marking machine, a printing head having type faces at its lower end and movable toward and away from the work, a track on said head in a predetermined relation to the type faces, a link for moving said head transversely of the work, a hanger mounted on said link and movable therewith, forwardly extending arms at the lower end of the hanger resiliently held normally in an uppermost limiting position, an ink applying roll on said arms, a guide associated with said roll adapted to contact with said track, and means for swinging said hanger to carry said ink roll over the type faces when the latter are in inoperative position, the path of travel of the ink roll with respect to the type faces being determined by said track and said guide.

6. In a marking machine, a printing head having type faces at its lower end and movable toward and away from the work, a track on said head in a predetermined relation to the type faces, a link for moving said head transversely of the work, a hanger mounted on said link and movable therewith, forwardly extending arms at the lower end of the hanger resiliently held normally in an uppermost limiting position, an ink applying roll on said arms, a guide associated with said roll adapted to contact with said track, means for swinging said hanger to carry said ink roll over the type faces when the latter are in inoperative position, the path of travel of the ink roll with respect to the type faces being determined by said track and said guide, and means for adjusting the position of said track with respect to the printing head.

7. In a marking machine, a printing member movable toward and away from the work, and means for applying ink to said printing member when in an inoperative position comprising an applying roll and a supply roll, common movable supporting means carrying said rolls in adjacent position, means for moving the applying roll across the surface of the printing member, and means for separating said rolls as the ink is applied to the printing member and bringing them together when they are in inoperative position away from the printing member thereby to provide a fresh supply of ink for the applying roll.

8. In a marking machine, a printing member movable toward and away from the work, and means for applying ink to said printing member when in an inoperative position comprising an applying roll and a supply roll, common movable supporting means carrying said rolls in adjacent position, means for moving the applying roll across the surface of the printing member, and means for separating said rolls as the ink is applied to the printing member and bringing them together when they are in inoperative position away from the printing member thereby to provide a fresh supply of ink for the applying roll, said means being constructed and arranged forcibly to press said rolls into contact.

9. In a marking machine, a printing member, means for supplying ink to said printing member comprising an applying roll, and means including a pair of arms for supporting said applying roll constructed and arranged to carry the applying roll across the face of the printing member, a supply roll movably supported on said arms for movement toward and away from the applying roll, and means for controlling the position of said supply roll for separating said rolls while ink is being applied and pressing them firmly together in another position.

10. In a marking machine, a printing member, a roll for applying ink to said printing member, a support for said roll comprising a pair of arms resiliently pressed in one direction to hold the roll firmly in contact with the printing member as it moves thereacross, an ink supply roll, pivoted hangers for said supply roll, and means for controlling the relative position of said rolls constructed and arranged to separate them when ink is applied to the printing member and to bring them together when the applying roll is in inoperative position.

11. In a marking machine, a printing member, means for supplying ink to said printing member comprising an applying roll and means including a pair of arms for supporting said applying roll constructed and arranged to carry the applying roll across the face of the printing member, a supply roll movably supported on said arms for movement toward and away from the applying roll, and means for controlling the position of said supply roll for separating said rolls while ink is being applied and pressing them firmly together in another position, said means being constructed and arranged to be operated by movement of the ink rolls toward and away from the printing member.

12. In a marking machine, an ink roll, a supporting arm therefor, said ink roll being provided with a shaft and said arm being slotted to receive said shaft and having an enlarged recess adjacent to said slot, and a movable retaining member slidable on said shaft adapted substantially to fit said recess.

13. In a marking machine, an ink roll, a supporting arm therefor, said ink roll being provided with a shaft on said arm being slotted to receive said shaft and having an enlarged recess adjacent to said slot, a movable retaining member slidable on said shaft adapted substantially to fit said recess, and resilient means for holding said sliding member in the recess.

14. In a marking machine, a shaft, an ink roll mounted on the shaft, a pair of supporting arms for said ink roll having slotted ends to receive said shaft and provided with recesses opening into said slots, and journal blocks for said shaft slidably mounted thereon and adapted to be moved into said recesses to support the ink roll in the arms.

15. In a marking machine, a shaft, an ink roll mounted on the shaft, a pair of supporting arms for said ink roll having slotted ends to receive said shaft and provided with recesses opening into said slots, journal blocks for said shaft slidably mounted thereon and adapted to be moved into said recesses to support the ink roll in the arms, stops on the shafts, and springs interposed between the slidable journal blocks and the stops.

16. In a marking machine, a work support, a printing member movable toward and away from the work, a shaft, an ink roll thereon, supporting arms for said ink roll having slots facing away from the surface of said printing member, and slidable journal blocks for said ink roll, said arms and said journal blocks being cooperatively constructed and arranged for interlocking engagement to hold the ink roll in the arms or for separation to permit removal of the ink roll in a direction away from the printing member by sliding the journal blocks away from the arms and dropping the shaft through the slots.

17. In a marking machine, a work support, a printing head having type surfaces in a predetermined plane, a carrier for said printing head, said carrier being mounted above and movable toward and away from said support, means for detachably securing the head to the carrier, guide tracks having portions in substantial alinement with the type surfaces on the head, and means for detachably securing said guide tracks on said carrier in a predetermined relation to said head.

18. In a marking machine, a work support, a printing head having type surfaces in a predetermined plane, a carrier for said printing head, said carrier being mounted above and movable toward and away from said support, spring-actuated means for detachably securing the head to the carrier, guide tracks having portions in substantial alinement with the type surfaces on the head, means for detachably securing said guide tracks on said carrier in a predetermined relation to said head, and means for adjusting the position of the guide tracks with respect to the type surfaces.

19. In a marking machine, an upright carrier, a printing head detachably mounted in depending position on said carrier and having a printing surface at its lower end, guide tracks having portions positioned substantially in the plane of said printing surface, extensible arms supporting said guide tracks detachably secured to said carrier, and means for adjusting the length of said arms.

20. In a marking machine, a printing head having a plurality of rotatably mounted type disks, a plurality of washers for rotating said disks, an operating handle mounted on said printing head above the level of the disks, and a gear connection between said operating handle and said washers.

21. In a marking machine, a printing head, a plurality of type disks on said head, means for heating said disks, and means for rotating said disks to interchange the type characters comprising an operating handle situated at a distance from and insulated from said head, and operating connections between said handle and said rotating means.

22. In a marking machine, a printing head, a type carrier movably mounted on said head for movement into and out of operative position with respect thereto, means for normally holding said carrier in operative position, and treadle-operated means for moving said carrier out of operative position.

23. In a marking machine, a printing head, a type carrier pivotally mounted on said head, resilient means for normally retaining said type carrier in predetermined relation to the printing head, and treadle-controlled means for moving said carrier against the action of said resilient means to carry it away from the head.

24. In a marking machine, a printing head, power operating mechanism to move said head toward and away from the work, manually operable means for controlling said power operating mechanism, a type carrier movably mounted on said printing head, manually operable means for moving said type carrier away from the printing head, and a member cooperating with both of said manually operable means constructed and arranged to prevent simultaneous operation thereof.

25. In a marking machine, a printing head having type disks, a type carrier interlocked with said type disks, means for movably supporting said type carrier on said printing head, means for displacing said type carrier to allow selective rotation of the type disks, and treadle-operated means constructed and arranged to cooperate with said displacing means when the printing head is in an inoperative position to hold the type carrier away from the printing head.

26. In a marking machine, a printing head having type disks, a type carrier interlocked with said type disks, means for movably supporting said type carrier on said printing head, and treadle-operated means for displacing said type carrier to allow selective rotation of the type disks when the printing head is in an inoperative position, said means including a broken connection between the treadle-operated means and the type carrier constructed and arranged to permit the printing head to be moved into operative position.

27. In a marking machine, a printing head movable toward and away from the work, said printing head having adjustable type disks, a type carrier on said printing head adapted to interlock with said type disks, means for movably supporting said type carrier on said printing head, an operating arm for displacing said type carrier with respect to said printing head, and a treadle-operated lever positioned to cooperate with said arm when the type carrier is in an inoperative position away from the work and constructed and arranged to hold the type carrier away from the printing head while the type disks are adjusted.

28. In a marking machine, a printing head having a plurality of adjustable type disks, a type carrier adapted to interlock with said type disks when in operative position, and means for movably supporting said type carrier on said printing head comprising parallel links, thereby to permit displacement of the type carrier so that the type disks may be adjusted.

29. In a marking machine, a printing head having a plurality of adjustable type disks, a type carrier adapted to interlock with said type disks when in operative position, parallel links for movably supporting said type carrier on said printing head, resilient means holding said type carrier in operative position, and an arm secured to one of said parallel links to turn the same and thereby to move the type carrier away from the printing head.

30. In a marking machine, a detachably mounted type plate, said plate being provided with slots for the reception of holding tongs having flattened ends to enable the type plate to be easily removed and handled even though heated.

31. In a marking machine, a type plate having a window opening for the passage of other printing characters upon the machine, said type plate having means for supporting a plurality of type members in alined position adjacent to the edge of said window, said supporting means comprising undercut ways which are widened toward the outer edge of the plate to facilitate the insertion of a type member having a short undercut projection.

32. In a marking machine, individual type characters, a type plate having supporting ways receiving a plurality of said type characters, and retaining springs behind each of said type characters, said type characters each being provided with a shoulder for cooperation with the ends of the retaining springs and also having a projecting tail extending over and covering a portion of the coacting retaining spring.

33. In a marking machine, a type head having a plurailty of type carrying disks provided with spaced teeth upon the ends of which are type characters, a type plate adapted to be detachably secured upon said printing head having a window opening for the reception of a row of teeth on the disks and a groove for the reception of the next adjacent row of teeth, type retaining means on said plate on opposite sides of said groove comprising undercut ways adjacent to the window opening, upstanding ribs remote from the window opening for preventing lateral displacement of the type characters, and an undercut rib extending at right angles to said ribs adapted to cooperate with undercut portions of the characters to prevent outward displacement of said type characters, and a plurality of retaining springs having their ends alongside said rib.

34. In a marking machine, a type plate provided with a central opening, and having spaced bars parallel to said opening, each of said bars being provided with a plurality of ways for the retention of individual type characters, the ways upon each of said bars being constructed and arranged to prevent displacement either laterally or toward and away from the plate and a series of releasable retaining members adapted for engagement with shoulders upon the type characters held in the ways and permitting individual removal of said characters.

35. In a marking machine, a work table, a printing member, power operated means for moving the printing member toward and away from a work piece on the work table, and means including a cam constructed and arranged to control the movement of said printing member to cause it to move in a straight line as it comes into contact with a work piece and to tilt said printing member toward the rear as it is raised away from the work.

PERLEY R. GLASS.